United States Patent [19]

Marple

[11] Patent Number: 4,833,346
[45] Date of Patent: May 23, 1989

[54] SWITCHED THRESHOLD COMPARATOR FOR A FIBER-OPTIC RECEIVER

[75] Inventor: Wendell P. Marple, Manassas, Va.

[73] Assignee: International Business Machines Corporation, Armonk, N.Y.

[21] Appl. No.: 768,290

[22] Filed: Aug. 22, 1985

[51] Int. Cl.$^4$ ............................................. H03K 5/153
[52] U.S. Cl. .................................... 307/359; 307/311
[58] Field of Search ............... 307/354, 359, 358, 311, 307/236; 328/115, 118

[56] References Cited

U.S. PATENT DOCUMENTS

| | | | |
|---|---|---|---|
| 3,509,474 | 11/1967 | Arnold et al. | 328/118 |
| 3,697,782 | 10/1972 | Matouka | 307/354 |
| 3,894,288 | 7/1975 | Musser, Jr. | 328/115 |
| 3,916,326 | 10/1975 | Woyton | 328/118 |
| 4,007,382 | 2/1977 | Warberg | 307/236 |
| 4,092,489 | 5/1978 | Birlmeier | 328/118 X |
| 4,160,175 | 7/1979 | Trout | 307/358 |

OTHER PUBLICATIONS

Beistle et al., "Voltage Comparator with Adjustable Trip Point and Hysteresis," Apr. 1976, p. 3574.
Harr, "Dual Threshold Peak Detector Circuit," Dec. 1977, p. 2827.
Rohen; "Wave-Shaping Circuit for a Magnetoresistive Read Head," Aug. 1978, pp. 984–985.
Martin, et al., "Dynamic Offset Null," Feb. 1981, pp. 4195–4196.
Hense, "Noise-Resistant Peak Detector," Dec. 1982, pp. 3897–3903.
Engelbrecht, "Input Offset Compensation for Photodiode Amplifier," Aug. 1983, pp. 1377–1378.

*Primary Examiner*—Theodore M. Blum
*Assistant Examiner*—John B. Sotomayor
*Attorney, Agent, or Firm*—H. St. Julian; John E. Hoel

[57] ABSTRACT

A fiber-optic receiver invention includes an improved edge detector which receives the input current pulse from a photo diode located at the output of an optical fiber link. The edge detector differentiates the input waveform and provides a sequential positive going and negative going pulse combination at its output. The output of the edge detector is applied to the input of a switched threshold comparator circuit. The switched threshold comparator senses the differentiated waveform signal and provides complementary output signals which are the desired data output waveforms. At the same time, the switched threshold comparator applies the output waveform to an emitter-coupled differential amplifier having an unbalanced collector circuit. The emitter-coupled differential amplifier has a first transistor connected between a current and the reference input to a differential comparator. The differential amplifier has a second transistor connected in emitter-coupled logic fashion to the first transistor, with its collector connected to ground potential. The respective inputs to the bases of the first and second transistors are the true and complement outputs of the differential comparator. When the output of the differential comparator goes positive, the unbalanced differential amplifier applies a negative going reference potential to the reference input to the differential comparator which switches the effective reference potential to a more negative value in anticipation of the negative going differentiated waveform which will next be output from the edge detector. After the negative going differential waveform from the edge detector is applied to the signal input of the differential comparator, the data output waveform goes to its less positive value. That less positive value is also applied to the unbalanced differential amplifier, thereby changing the reference potential applied to the reference input of the differential comparator, to a more positive value in anticipation of the positive going waveform which will next be output from the edge detector circuit. In this manner, the effective threshold of the differential comparator is switched between two predetermined values in response to the output of the differential comparator.

6 Claims, 2 Drawing Sheets

SWITCHED THRESHOLD COMPARATOR FOR A FIBER-OPTIC RECEIVER

BACKGROUND OF THE INVENTION

1. Technical Field

The invention disclosed broadly relates to transistor circuits and more particularly relates to improvements in fiber-optic receivers.

2. Background Art

Fiber optic communications systems typically employ a photo diode or other optical detector located at an output of a fiber-optic link for converting the optical energy of a light pulse transmitted in the fiber to an electrical pulse suitable for electrical processing. Since fiber-optic communications are conducted at high data rates on the order of $10^8$ binary bits per second, it is imperative that the timing and synchronization at the receiving end of the fiber-optic link be very precise. Typically, it is necessary to decode the input optical signal to regenerate the bit timing, and therefore data edge skew must be minimized at the receiver.

In high speed serial data reconstruction at the receiving end of the fiber-optic link, receiver circuits in the prior art typically employed two comparators to convert the detected edges of the electrical signal into digital output data. One comparator is used with a positive threshold to detect positive edges and the other comparator is used with a negative threshold to detect negative edges. The prior art has experienced significant problems even with careful comparator matching, the difference in propagation delay between the two comparators can distort the true edge location of the reconstructed data waveform. In addition, prior art receiver circuits experienced problems related to reference voltage drift, the elimination or minimization of extraneous noise, and a problem of requiring large quantities of circuitry to minimize noise, detect incoming signals, and perform the necessary comparison with a minimum of skew so that reliable output data waveforms could be obtained.

SUMMARY OF THE INVENTION

These and other objects, features and advantages of the invention are accomplished by a fiber-optic receiver disclosed herein. The fiber-optic receiver includes an improved edge detector circuit which receives the input current pulse from a photo diode located at the output of an optical fiber link. The edge detector circuit differentiates the input waveform and provides a sequential positive going and negative going pulse combination at its output. The edge detector circuit has an improved noise immunity characteristic by virtue of its adding a pedestal voltage to the differentiated waveform in the region following the positive going or negative going differentiated signal. This pedestal voltage increases the effective signal amplitude of the portion of the differentiated signal following the pedestal voltage so that any noise which occurs during the pedestal interval of the pedestal voltage is effectively separated by the magnitude of the pedestal voltage from a threshold potential used to detect the following differentiated waveform.

The output of the edge detector circuit is applied to an input of a switched threshold comparator circuit portion of the invention. The switched threshold comparator circuit, which includes a differential comparator, senses the differentiated waveform signal and provides complementary output signals which are the desired data output waveforms. At the same time, the switched threshold comparator applies its output signals to an emitter-coupled differential amplifier having an unbalanced collector circuit. The emitter-coupled differential amplifier has a first transistor connected between a current sink and a reference input of the differential comparator. The differential amplifier has a second transistor connected in emitter-coupled fashion to the first transistor, with its collector connected to ground potential. The respective inputs to the bases of the first and second transistors are the true and complementary output signals of the differential comparator. When the complementary output of the differential comparator goes positive, the unbalanced differential amplifier operates to connect a current sink to the positive reference input of the differential comparator. The differential comparator then switches the effective reference potential to a more negative value in anticipation of a negative going differentiated waveform which will be the next generated signal by the edge detector. After the negative going differentiated waveform from the edge detector is applied to the signal input of the differential comparator, the data output waveform goes to its less positive value. That less positive value is also applied to the unbalanced differential amplifier, thereby changing the reference potential applied to the reference input of the differential comparator, to a more positive value in anticipation of a positive going waveform which will be the next generated signal by the edge detector circuit. In this manner, the effective threshold of the differential comparator is switched between two predetermined values in response to the output of the differential comparator. This allows for a minimum time skew in the application of either the positive going reference or the negative going reference and in the generation of positive and negative output data signals. Moreover, it allows for a self correcting characteristic in that if the nominal value for the first or second magnitudes of the reference voltage drifts, both values drift by the same amount. The invention further has the advantage that it can be embodied in a minimum amount of circuitry and the invention has still the further advantage that the number of noise sources for the circuit is minimized.

OBJECT OF THE INVENTION

It is therefore an object of the invention to provide an improved fiber-optic receiver.

It is another object of the invention to provide an improved fiber-optic receiver having an improved signal comparator circuit.

It is still a further object of the invention to provide an improved signal comparator circuit.

It is yet another object of the invention to provide a fiber-optic receiver having an improved signal comparator which accepts signals from an improved edge detector circuit.

It is still a further object of the invention to provide an improved fiber-optic receiver which has a minimum skew characteristic.

It is yet a further object of the invention to provide an improved fiber-optic receiver that has a self correcting characteristic for its reference voltage in its signal comparator circuit.

It is yet a further object of the invention to provide an improved fiber-optic receiver having a minimum quantity of circuitry.

It is yet another object of the invention to provide an improved fiber-optic receiver which has a low noise characteristic.

BRIEF DESCRIPTION OF THE DRAWINGS

The foregoing and other advantages of the invention will be more fully understood with reference to the description of the best mode and the drawing wherein.

DESCRIPTION OF THE BEST MODE FOR CARRYING OUT THE INVENTION

Figure 1:
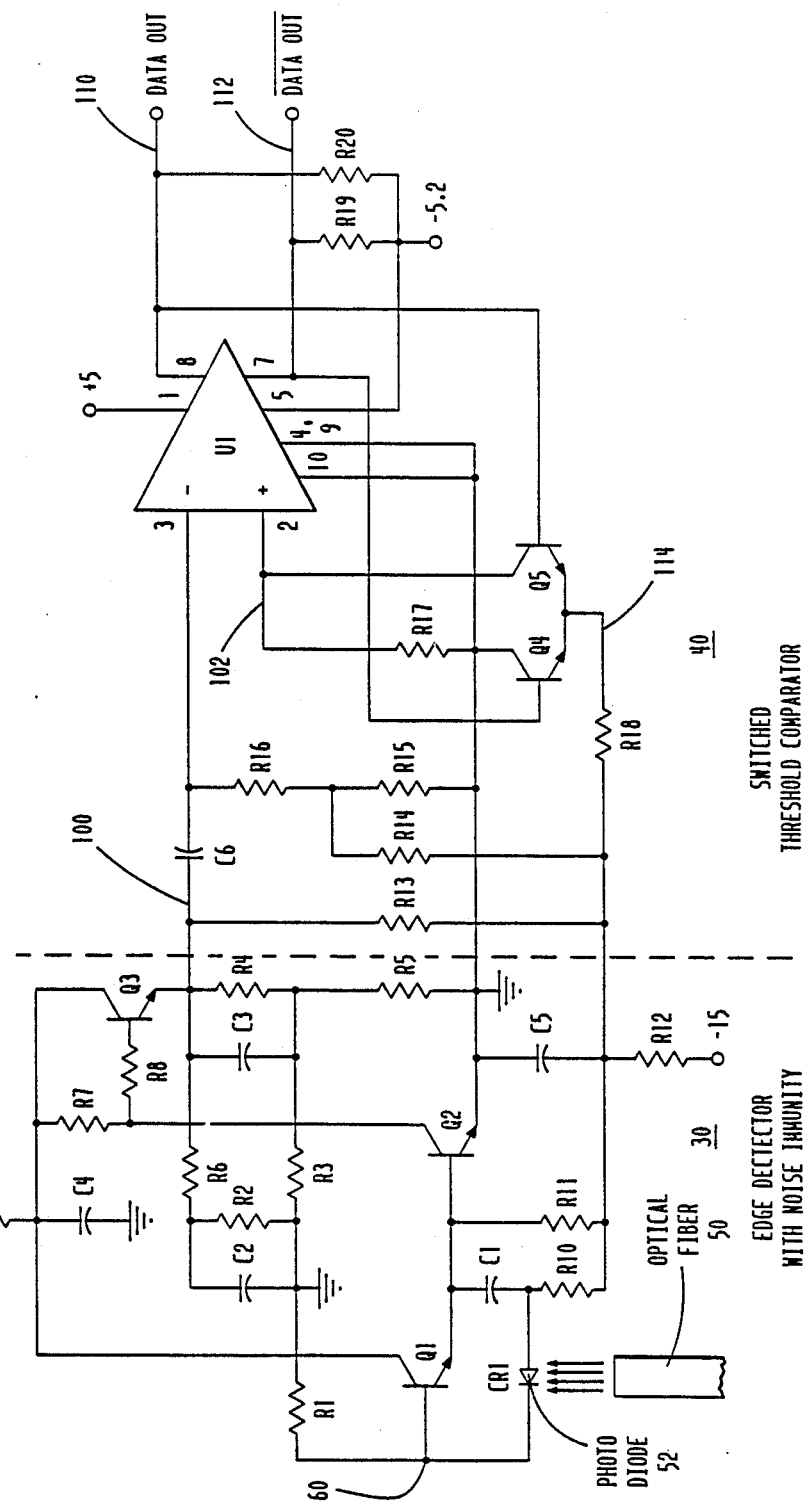
FIG. 1 is a circuit schematic diagram of the fiber optics receiver and includes a depiction of the edge detector 30 and the switched threshold comparator 40.

A fiber-optic receiver includes an improved edge detector circuit which receives an input current pulse from a photo diode located at the output of an optical fiber link. The edge detector circuit differentiates the input waveform and provides a sequential positive going and negative going pulse combination at its output. The edge detector circuit has an improved noise immunity characteristic by virtue of its adding a pedestal voltage level to the differentiated waveform in the region following the positive going or negative going differentiated signal. This pedestal voltage level increases the effective signal amplitude of the portion of the differentiated waveform following the pedestal voltage level so that any noise which occurs during the interval of the pedestal voltage level is effectively separated by the magnitude of the pedestal voltage level from a threshold potential used to detect the following differentiated waveform.

The output of the edge detector is applied to an input of a switched threshold comparator circuit portion of the invention. The switched threshold comparator circuit, which includes a differential comparator, senses the differentiated waveform and provides complementary data output signals which are the desired data output waveforms. At the same time, the switched threshold comparator applies its output waveform to an emitter-coupled differential amplifier having an unbalanced collector circuit. The emitter-coupled differential amplifier has a first transistor connected between a current sink and a reference input of the differential comparator. The differential amplifier has a second transistor connected in emitter-coupled fashion to the first transistor, with its collector connected to ground potential. The respective inputs to the bases of the first and second transistors are the true and complementary outputs of the differential comparator. When the data output of the differential comparator goes positive, the unbalanced differential amplifier operates to connect the current sink to the reference input of the differential comparator. The differential comparator then switches the effective reference potential to a more negative value in anticipation of a negative going differentiated waveform which will be generated next by the edge detector circuit. After the negative going differentiated waveform from the edge detector circuit is applied to a signal input of the differential comparator, the data output goes to its less positive value. That less positive value is also applied to the unbalanced differential amplifier, thereby changing the reference potential applied to the reference input of the differential comparator, to a more positive value in anticipation of a positive going waveform which will be generated next by the edge detector circuit. In this manner, the effective threshold of the differential comparator is switched between two predetermined values in response to the output of the differential comparator. This allows for a minimum time skew in the detection of either the positive going edge or the negative going edge of the input data. Moreover, it allows for a self correcting characteristic in that if the nominal value for the first or second magnitudes of the reference voltage drifts, both values drift by the same amount. The invention further has the advantage that it can be embodied in a minimum amount of circuitry and the invention has still the further advantage that the number of noise sources for the circuit is minimized.

Turning now to FIG. 1, an optical fiber 50 is shown transmitting a light pulse to a photo diode 52 whose cathode is connected at node 60 to the base of a NPN transistor Q1. The transistor Q1 is connected in Darlington configuration to a NPN transistor Q2, whose emitter is connected to ground potential. A NPN transistor Q3 has its collector connected through a load resistor R9 to a positive voltage of +15 volts and has its base connected through resistor R8 to the collector of the transistor Q2. The emitter of transistor Q3 is connected to output node 100 for an edge detector circuit 30. The node 100 is connected through resistors R6, R2 and R1 to node 60. Capacitor C2, which is coupled to resistors R2 and R6, is connected to ground potential as shown. Resistor R3 is connected through resistor R4 and capacitor C3 to the emitter of the transistor Q3. The resistor R3 is also connected through resistor R5 to the emitter of transistor Q2 which is at ground potential.

Figure 2:
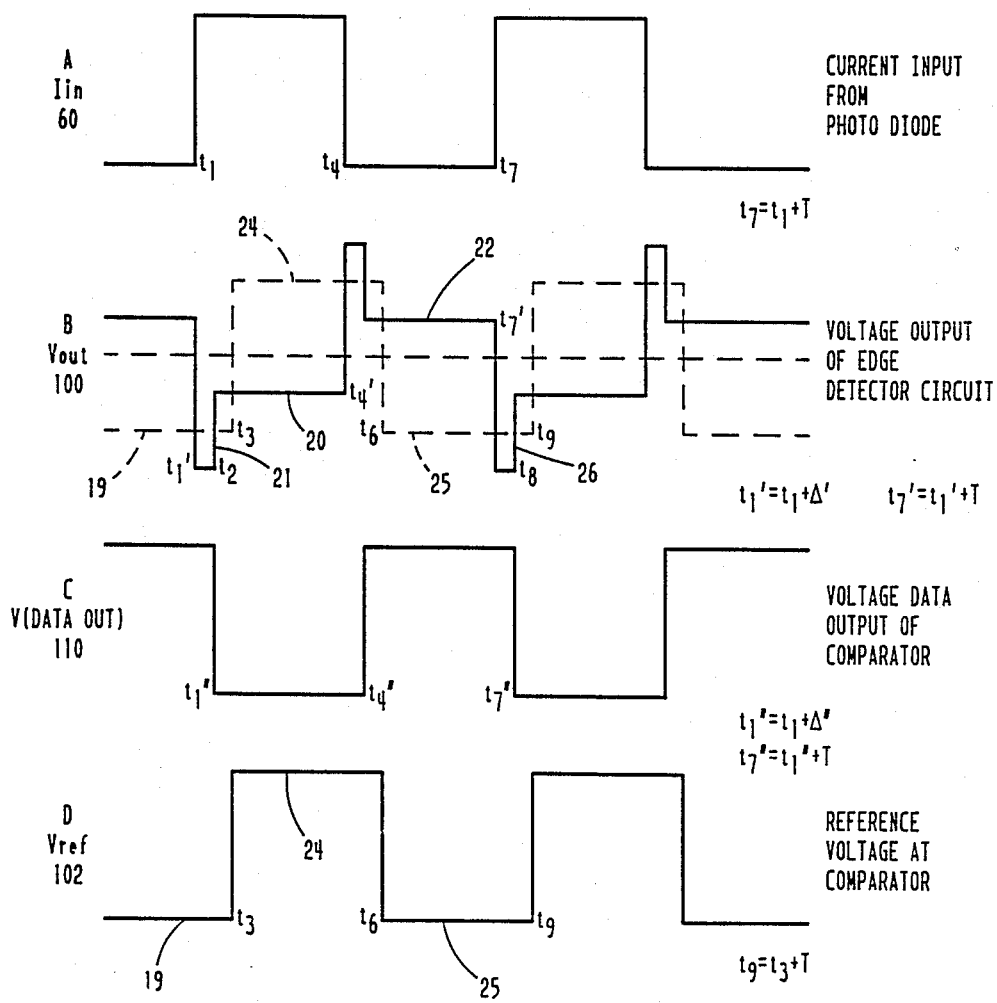
FIG. 2 is a series of four timing diagrams for the waveforms generated in the fiber-optic receiver shown in FIG. 1. Waveform A corresponds to the current waveform at node 60. Waveform B corresponds to the voltage waveform at node 100. Waveform C corresponds to the voltage waveform at node 110. Waveform D corresponds to the voltage waveform at node 102.

The operation of the edge detector circuit 30 is described in greater detail in the companion patent application MA9-85-007. In operation, the network of the resistors R1, R2, R3 and R6 in conjunction with the capacitor C2 forms a feedback filter means which enables the conversion of waveform A of FIG. 2 at the input node 60 into waveform B at the output node 100 of the edge detector circuit 30 as is shown in FIG. 2. The essential characteristic of waveform B, which is output at node 100, is that it roughly corresponds to an inverted differentiated waveform of the input waveform at node 60. It deviates from a conventionally differentiated waveform in the important characteristic that a negative pedestal voltage level portion 20 follows the rising portion of the negative differentiated waveform 21 so as to increase the distance between any noise signals on the pedestal voltage level portion 20 and the threshold voltage 24 which will be used to detect the next, positive going portion 23 of the differentiated waveform B. Similarly, a positive pedestal voltage level 22 for the waveform B follows the negative going portion of the positive differentiated waveform and increases the distance between any noise which may be superimposed on the positive pedestal voltage level 22 and the negative threshold 25 which will be used to detect the next occurring negative going differential waveform 26 of waveform B in FIG. 2.

The waveform B, which is output at the node 100, is offset toward a negative reference by resistors R13 and R15 and is then applied to the negative input terminal 3 of the differential comparator U1 shown in FIG. 1. The differential comparator U1 has its positive input terminal 2 used as the reference voltage input. The differential comparator U1 has a first output terminal 8 connected to the data output node 110 and a second output terminal 7 connected to the complementary data output terminal 112. The operation of the differential comparator U1 can be characterized as follows. If the potential at the positive input terminal 2 exceeds and the potential at the negative input terminal 3, the first output terminal 8 outputs a negative level and the second output terminal 7 outputs a complementary waveform, a positive output level. Correspondingly, if the potential at the positive input terminal 2 is less than the potential at the negative input terminal 3 for the differential comparator U1, the first output terminal 8 outputs a relatively more positive level and the second output terminal 7 outputs a complementary waveform, a relatively more negative level.

In accordance with the invention, an unbalanced emitter-coupled differential amplifier is a part of the switched threshold comparator circuit 40, and consists of a first NPN bipolar transistor Q5 whose collector is connected to the positive input terminal 2 and a second NPN bipolar transistor whose collector is connected to ground potential. The base of the first transistor Q5 is connected to the first output terminal 8 of the differential comparator U1 and the base of the second NPN transistor Q4 is connected to the second output terminal 7 of the differential comparator U1. If the base of transistor Q5 is more positive than the base of the transistor Q4, then the emitter-coupled differential amplifier operates to switch into conduction the transistor Q5 and switch out of conduction transistor Q4, so that the positive reference terminal 2 of the differential comparator U1 is connected to the current sink whose current is essentially equal to the current through the biasing resistor R18. By virtue of the I/R drop across the resistor R17, the potential at the positive reference input 2 of the differential comparator U1 decreases to a negative reference voltage. Alternately, if the base of the transistor Q4 is more positive than the base of the transistor Q5, then the differential comparator U1 operates so that the transistor Q4 switches into conduction and the transistor Q5 switches out of conduction so that no current flows through the resistor R17 and, by virtue of the absence of the I/R drop across the resistor R17, the potential at the positive reference input 2 for the differential comparator U1, increases to ground potential. Since the bases of the transistors Q5 and Q4 are respectively connected to the complementary outputs 7 and 8 of the differential comparator U1, either Q5 or alternately Q4 will be exclusively conducting at any particular time.

Thus, the overall operation for the switched threshold comparator circuit 40 is as follows. Referring to FIG. 1, in conjunction with the timing diagrams of FIG. 2, at time t1, the photo current at the node 60 rises as is shown in waveform A. The edge detector circuit 30 responds at a slightly later time t1' by having the output node 100 of the edge detector circuit 30 undergo a negative transition. After a small interval, at time t2, the waveform B at the output node 100 rises at 21 to the pedestal voltage level 20. During this interval, the output waveform at 100 has an enhanced noise immunity, as was described above. The negative differentiated waveform B at 21, is applied at the negative input terminal 3 of the differential comparator U1. As was described above, the differential comparator U1 undergoes a negative transition to a negative level at the time t1" as is shown for the waveform C in FIG. 2. This negative level is applied at the data output node 110 and is also applied to the base of the transistor Q5 in the unbalanced differential amplifier circuit. The transistor Q4 enters into conduction and the transistor Q5 ceases conduction, thereby connecting ground potential to the positive reference terminal 2 of the differential comparator U1. The ground potential is a more positive reference potential and is shown as the potential 24 for the waveform D of FIG. 2. For ease of understanding of the operation of the invention, the waveform D of FIG. 2 is also superimposed on the waveform B of FIG. 2 to illustrate how the reference potential is compared with the differentiated waveform B which is applied to the negative input terminal of the differential comparator U1. Thus, it can be seen with reference to FIG. 2 that the comparator 40 has switched the reference potential at time t3 from a relatively negative value at 19 of waveform D to the relatively positive value at 24 in response to the receipt of the negative going differentiated waveform 21 of waveform B. During approximately the same interval, the negative pedestal 20 occurs as part of the differentiated waveform B. Thus, it is seen that as the time t4 approaches the input photo current at node 60 and shown in waveform A makes a negative transition, the amplitude difference between the pedestal 20 and the positive reference potential 24 is large enough to minimize the occurrence of detecting noise which may be superimposed upon the pedestal 20. The magnitude of the reference potential 24 is less than the full positive amplitude of the positive differentiated waveform B, so that a valid detection of the positive differentiated waveform B can be obtained.

Continuing with the description of the operation, in response to the negative excursion of the photo current at node 60 at time t4, the edge detector circuit 30 will provide a positive going excursion of the waveform B at time t4'. In accordance with the operation of the edge detector circuit 30, at a slightly later time t5, the differentiated waveform B will undergo the negative transition at 23 to the positive pedestal voltage at 22. The positive pedestal voltage at 22 is applied at the output node 100 of the edge detector circuit 30, to the negative input terminal 3 of the differential comparator U1. The differential comparator U1 then has its first output terminal 8 undergo a positive going transition at a slightly later time t4" as is shown by the waveform C in FIG. 2. This transition provides a more positive voltage level at the data output node 110. This more positive voltage is applied to the base of transistor Q5 which now enters into conduction and since the complementary voltage output, which is present on terminal 7, is applied to the base of transistor Q4. Transistor Q4 now turns off. Since the transistor Q5 is on, the relatively more negative potential is produced at the positive input node to the differential comparator U1, thereby lowering the effective reference potential to the more negative value at 25 as shown in the waveform D of FIG. 2, in anticipation of the next occurring negative differentiated waveform at 26 of waveform B. Thus, it is seen that during the interval between time t6 and t7' of FIG. 2, there is a relatively large potential difference between the pedestal voltage 22 of waveform B and the negative reference voltage level 25 of waveform D, thereby enhancing the noise immunity for the circuit. It is also seen that the switch between the more positive reference potential 24 and the more negative reference potential 25 was performed by the differential amplifier circuit transistors Q4 and Q5, in response to the differential comparator U1 receiving the positive differentiated waveform B at 23. With regard to time skew, since the same differential comparator U1 is employed to generate both the positive reference potential 24, the negative reference potential 25 and the positive and negative data output signals, there is no difference in the precision of response of that differential comparator U1 to transitions at the output node 100 of the edge detector circuit 30. Thus, time skew is minimized.

The resulting circuit has a minimum time skew, is self correcting for reference voltage drift, has a minimized number of noise sources, and all of this is accomplished with a minimum amount of circuitry.

Although a specific embodiment of the invention has been disclosed, it will be understood by those of skill in the art that the foregoing and other changes in form and details may be made therein without departing from the spirit and the scope of the invention.

What is claimed is:

1. A fiber-optic receiver comprising:
   detector means, responsive to a pulse of light, for generating an electrical signal;
   means for conditioning the electrical signal developed by the generating means said conditioning means including an edge detector circuit with an input connected to the detector for converting the electrical signal into a differentiated output waveform having a plurality of noise immune trailing pedestals as a part of the output waveform generated at an output node of the circuit;
   means for comparing the conditioned electrical signal to a selected one of a plurality of threshold voltage levels and generating data output signals and said comparing means including a differential comparator having a first input thereof coupled to the output node of the edge detector circuit and complementary data outputs;
   means, responsive to the generated data output signals, for establishing the selected one of the plurality of threshold voltage levels said threshold generating means including a differential amplifier having inputs coupled to the complementary outputs of the differential comparator and an output coupled to a second input of the differential comparator.

2. The fiber-optic receiver as recited in claim 1 wherein the signal generating means includes a photo detector.

3. The fiber-optic receiver as recited in claim 2, wherein the edge detection circuit includes:
   a first switching means having a control input connected to the photo detector with its principal current conducting path connected between a first reference potential and a first node;
   a second switching means having its control input connected to the first node and its principal current conducting path connected between a second reference potential and a second node;
   a third switching means having its control input connected to the second node and its principal current conducting path connected between the first reference and the output node;
   a feedback filter means having a first terminal connected to the output node and a second terminal connected to an input node;
   the feedback filter means operating on positive going pulse signals input to the node to differentiate the input signals in a negative differentiated pulse and a positive differentiated pulse forming a differentiated signal;
   the feedback filter means acting on the negative differentiated pulse so that its downward excursion has a greater amplitude than its following upward excursion and on the positive differentiated pulse so that its upward excursion has a greater amplitude than its following downward excursion;
   whereby noise signals superimposed upon said differentiated signal waveform will be of lesser amplitude than a positive going differentiated pulse following said negative going differentiated pulse.

4. The fiber-optic receiver as recited in claim 3 wherein the differential amplifier includes a first NPN bipolar transistor and a second NPN bipolar transistor connected in emitter-coupled configuration.

5. The fiber-optic receiver as recited in claim 7 wherein the second input of the differential comparator is a reference input and wherein the first NPN transistor has its emitter-collector path connected between a current sink and the reference input of the differential comparator and the second NPN transistor has its emitter-collector path connected between the current sink and the second reference potential;
   the differential amplifier applying a relatively positive reference potential to the reference input of the differential comparator during a first interval when the positive differentiated waveform is output from the edge detector circuit to the first input of the differential comparator, the differential comparator outputting a relatively positive voltage at a true output thereof in response to the positive differentiated signal;
   the differential amplifier responding to the positive going signal output from the true output of the differential comparator by switching on the first transistor and switching off the second transistor, thereby connecting the current sink through the first transistor to the reference input of the differential comparator establishing a threshold voltage level thereat in anticipation of the receipt of a subsequent negative differential waveform output from the edge detector circuit;
   whereby the threshold voltage level for the differential comparator is adaptively switched to receive the enhanced noise immunity signal output from the edge detector circuit.

6. A fiber-optic receiver comprising:
   an edge detector circuit having an enhanced noise immunity characteristic, with an input connected to a photo detector, for converting an input signal waveform into a differentiated output waveform having noise immune trailing pedestals in the waveform generated at an output node thereof;
   a switched threshold comparator including a differential comparator having a signal input node connected to said output of said edge detector circuit, a reference input node for generating a positive output signal at said first output node thereof in response to a positive differentiated signal output from said edge detector circuit;

an unbalanced differential amplifier circuit in said switched threshold comparator, having a first NPN bipolar transistor and a second NPN bipolar transistor, said first and second transistors connected in emitter-coupled configuration;

said first transistor having its emitter-collector path connected between a current sink and said reference input to said differential comparator and said second transistor having its emitter-collector path connected between said current sink, with the collector thereof connected to a reference potential;

said differential amplifier applying a relatively positive reference potential to said reference input of said differential comparator during a first interval when said positive differentiated waveform is output from said edge detector circuit to said signal input of said differential comparator, said differential comparator outputting a relatively positive voltage at said first output terminal thereof in response to said positive differentiated signal;

said unbalanced differential amplifier responding to said positive going signal output from said first output of said differential comparator by switching on said first transistor and switching off said second transistor, thereby connecting said current sink through said first transistor to said input reference terminal of said differential comparator establishing a reference potential in anticipation of the receipt of a subsequent negative differentiated waveform output from said edge detector circuit;

whereby said reference potential for said differential comparator is adaptively switched to receive the enhanced noise immunity signal output from said edge detector circuit.

* * * * *